United States Patent
Cianciolo et al.

(10) Patent No.: US 12,478,145 B2
(45) Date of Patent: Nov. 25, 2025

(54) MALE TOUCH FASTENER ELEMENTS

(71) Applicant: Velcro IP Holdings LLC, Manchester, NH (US)

(72) Inventors: David D. Cianciolo, Sandown, NH (US); Matthew P. Cunningham, Concord, NH (US)

(73) Assignee: Velcro IP Holdings LLC, Manchester, NH (US)

( * ) Notice: Subject to any disclaimer, the term of this patent is extended or adjusted under 35 U.S.C. 154(b) by 92 days.

(21) Appl. No.: 18/609,095

(22) Filed: Mar. 19, 2024

(65) Prior Publication Data

US 2024/0381980 A1 Nov. 21, 2024

Related U.S. Application Data

(60) Provisional application No. 63/467,620, filed on May 19, 2023.

(51) Int. Cl.
*A44B 18/00* (2006.01)

(52) U.S. Cl.
CPC ...... *A44B 18/0065* (2013.01); *A44B 18/0049* (2013.01); *A44B 18/0053* (2013.01)

(58) Field of Classification Search
CPC ............ A44B 18/0065; A44B 18/0049; A44B 18/0053; A44B 18/0061; A44B 18/0046; Y10T 24/2792; Y10T 24/27; Y10T 24/2783
USPC ............................ D8/382; D11/208; 428/100
See application file for complete search history.

(56) References Cited

U.S. PATENT DOCUMENTS

| | | | |
|---|---|---|---|
| 3,320,649 A | 5/1967 | Naimer | |
| 3,586,220 A | 6/1971 | Reinsberg | |
| 4,001,366 A | 1/1977 | Brumlik | |
| 4,894,060 A | 1/1990 | Nestegard | |
| 5,212,853 A | 5/1993 | Kaneko | |
| 5,887,320 A | 3/1999 | Provost et al. | |
| 5,922,222 A | 7/1999 | Jens et al. | |
| 6,000,106 A | 12/1999 | Kampfer et al. | |
| 6,357,088 B2 | 3/2002 | Provost et al. | |
| 6,579,162 B2 * | 6/2003 | Chesley | B29C 43/222 451/538 |
| 7,185,401 B2 | 3/2007 | Ausen et al. | |
| RE42,475 E | 6/2011 | Armela et al. | |
| 8,256,068 B2 * | 9/2012 | West | A44B 18/0065 24/450 |

(Continued)

OTHER PUBLICATIONS

International Search Report and Written Opinion in International Appln. No. PCT/US2024/020495, mailed on Jul. 3, 2024, 12 pages.

*Primary Examiner* — Jack W Lavinder
(74) *Attorney, Agent, or Firm* — Fish & Richardson P.C.

(57) ABSTRACT

A touch fastener element has a stem rising from a resin sheet, and a head disposed at an upper end of the stem and spaced from the resin sheet. The head has two arms that extend in opposite directions to distal ends, the arms having respective lower surfaces that overhang the resin sheet. The fastener element has two opposite side surfaces that form contiguous surfaces of the stem and both arms. The lower surface of each arm defines at least one recess extending away from the resin sheet and disposed between lower arm surface portions that face the resin sheet, such that the recess of each arm is spaced from both the stem and the distal end of the arm.

17 Claims, 7 Drawing Sheets

(56) References Cited

U.S. PATENT DOCUMENTS

| | | | |
|---|---|---|---|
| 8,273,102 B2* | 9/2012 | Danitz | A61B 17/122 |
| | | | 606/207 |
| 8,663,409 B2 | 3/2014 | Mueller | |
| 9,282,790 B2 | 3/2016 | Rocha et al. | |
| 9,655,413 B2 | 5/2017 | Adams et al. | |
| 9,918,525 B2 | 3/2018 | Gallant et al. | |
| 10,123,919 B2 | 11/2018 | Ramos-Medina et al. | |
| 11,137,005 B2 | 10/2021 | Cosgrove et al. | |
| 2002/0162197 A1 | 11/2002 | Romanko et al. | |
| 2004/0194262 A1 | 10/2004 | Kurtz, Jr. et al. | |
| 2010/0285268 A1* | 11/2010 | Chen | B32B 7/05 |
| | | | 428/100 |
| 2011/0271496 A1* | 11/2011 | Tuma | A44B 18/0065 |
| | | | 24/442 |
| 2015/0052710 A1 | 2/2015 | Idrizovic et al. | |
| 2017/0156451 A1* | 6/2017 | Cheng | A44B 18/0065 |
| 2019/0008240 A1 | 1/2019 | Adams et al. | |
| 2020/0305558 A1 | 10/2020 | Takekawa et al. | |

* cited by examiner

MALE TOUCH FASTENER ELEMENTS

CROSS REFERENCE TO RELATED APPLICATION

This application claims priority to U.S. Provisional Application No. 63/467,620, filed May 19, 2023, which is hereby incorporated by reference in its entirety for all purposes.

TECHNICAL FIELD

This invention relates to touch fastener elements, and more particularly to touch fastener elements with overhanging arms with molded underside surfaces.

BACKGROUND

Touch fasteners are useful for releasable engagement of surfaces in products ranging from diapers to construction materials. In most cases, the engagement is between an array of very small male fastener elements and a field of fibers or loops. Some male fastener elements have heads that overhang in only two opposite directions. These are often referred to as palm tree fastener elements. Molding such palm tree fastener elements can be accomplished at high speeds in fixed cavities in a rotating mold roll, but the shapes that can be molded and then extracted from the cavities at high speeds can be limited. Palm tree fastener elements of more aggressive profiles, which could be difficult to demold, can instead be made by severing longitudinal rails having the desired profile, and then stretching a sheet connecting the severed rail segments to space them apart, but this results in severed, not molded, side surfaces and requires stretching of the sheet, which can impede certain desired processes, such as molding the fastener sheet directly onto a substrate that would be harmed by such stretching. Improvements in fastener element shape, and in methods of making such shapes, are continually sought.

SUMMARY

One aspect of the invention features a touch fastener element having a stem rising from a resin sheet, and a head disposed at an upper end of the stem and spaced from the resin sheet. The head has two arms that extend in opposite directions to distal ends, and the arms have respective lower surfaces that overhang the resin sheet. The fastener element has two opposite side surfaces that form contiguous surfaces of the stem and both arms. The lower surface of each arm defines at least one recess extending away from the resin sheet into the arm and disposed between lower arm surface portions that face the resin sheet, such that the recess of each arm is spaced from both the stem and the distal end of the arm.

In some embodiments, the recess of each arm is bounded by a shoulder formed by the lower surface of the arm between the recess and the stem.

In some cases, the recess of each arm is defined between generally vertical portions of the lower surface of the arm.

In some examples, the recess of each arm is defined between two downwardly extending head projections, both spaced laterally from the stem.

In some embodiments, the lower surface of each arm defines multiple spaced apart recesses extending away from the resin sheet, with each of the recesses spaced from both the stem and the distal end of the arm. In some cases, each recess is defined by two molded surfaces that meet at an apex of the recess. In some examples, all of the multiple recesses defined by the lower surface of each arm are of the same size.

In some cases, the recesses are defined by molded portions of the lower surfaces of the arms.

In some examples, each arm features only one recess.

In some applications, the head has a convex upper surface facing away from the resin sheet and extending to the distal ends of both of the two arms.

In some cases, the fastener element has a cross-section that is constant over a thickness of the fastener element in a direction perpendicular to the opposite directions. In which the arms extend.

In some embodiments, the stem is of resin contiguous with resin of the resin sheet.

In some applications, the fastener element is bounded by only molded surfaces. In some other applications, the two opposite surfaces are formed of severed resin.

Another aspect of the invention features a fastener product with a multiplicity of such touch fastener elements, arranged in an array with the stems of each of the touch fastener elements of the array rising from a common resin sheet.

In some embodiments, the touch fastener element heads are of a lateral width along a column of the array, the heads of adjacent fastener elements in the column are spaced apart a distance less than the lateral width, and the stems of the adjacent fastener elements are spaced apart a distance greater than the lateral width, such that the fastener product can be engaged with itself to form a releasable fastening.

In some examples, the fastener elements are arranged in a checkerboard pattern in the array, with adjacent columns of fastener elements offset from one another.

Another aspect of the invention features a method of making such a fastener product, either by the cut-and-stretch or continuous molding methods described herein.

The fastener element shapes disclosed herein can be very useful in snagging and retaining fibers, and in directing snagged fibers into particular recesses in the underside surface of the fastener element arms. Such shapes become particularly economical when produced at very high speeds through a molding process.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figures 1, 1A:
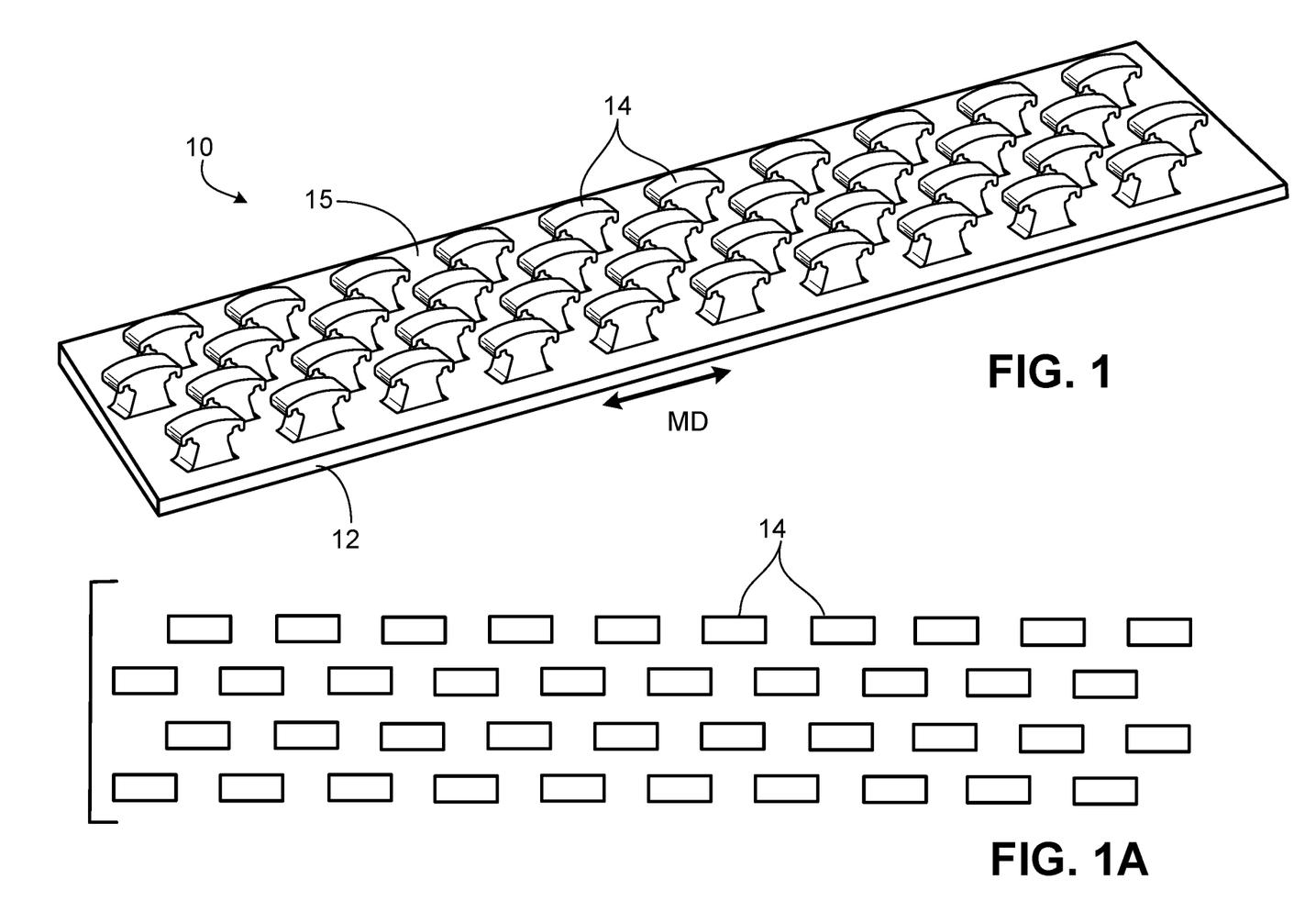
FIG. 1 is a perspective view of a first embodiment of fastener product.
FIG. 1A is a top view of the array of fastener elements of the product of FIG. 1.

Referring first to FIGS. 1 and 1A, fastener product 10 has a base sheet 12 of resin and an array of male touch fastener elements 14 extending from a broad resin side surface 15 of the base sheet. To give some proportion, base sheet 12 is about 60 μm thick and can be up to one meter or more in width, and can be manufactured in continuous length in the machine direction MD and rolled for transport. The fastener elements are arranged in an array on the base sheet surface, with a density of up to about 535 per square centimeter, each fastener element extending only about 0.27 to 0.28 mm from the base sheet surface. The fastener elements are configured to snag very fine fibers of material, such that as the two mated materials are peeled away from one another, the snagged fibers are stretched taut prior to being released. In this manner, the two materials together form a releasable fastening. The fibers the fastener elements are designed to snag and retain are extremely fine, as will be discussed in more detail below, making this size of fastener product 10 particularly useful in snagging very low-loft knit or non-woven materials, such as those formed of extruded fibers or cotton or silk or those forming the outer covers of disposable garments such as diapers. Larger versions can be more useful with woven or knit loops, such as Loop 3368 from Velcro USA Inc. A few different embodiments of fastener product 10 are discussed below.

As shown in FIG. 1, each fastener element 14 has a side profile or shape that is constant over a thickness in the direction perpendicular to the machine direction. This perpendicular direction is called the cross-machine direction (CD). The fastener elements are arranged in an array of staggered, spaced-apart columns, each column extending along the machine direction, such that the fastener elements in the array are arranged in a checkerboard pattern with each fastener element spaced from all of its neighbors to permit fibers to extend into the interhook spaces for snagging by the overhanging portions of the heads of the fastener elements.

Figure 2:
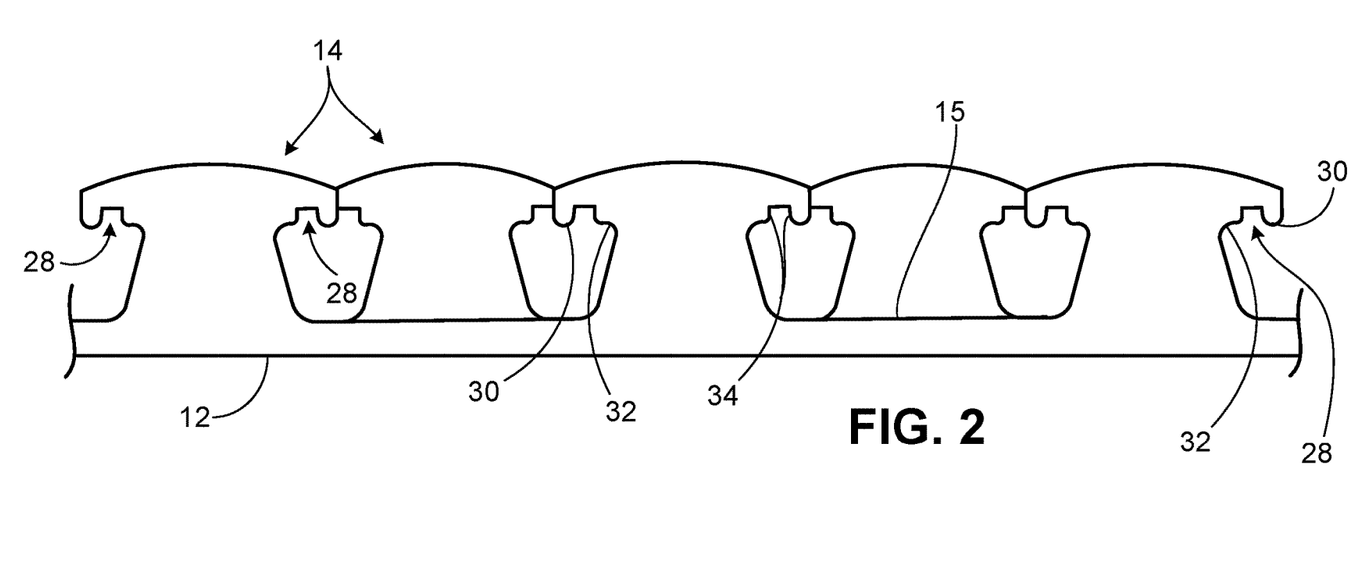
FIG. 2 is a side view of the fastener product of FIG. 1.
Figure 3:
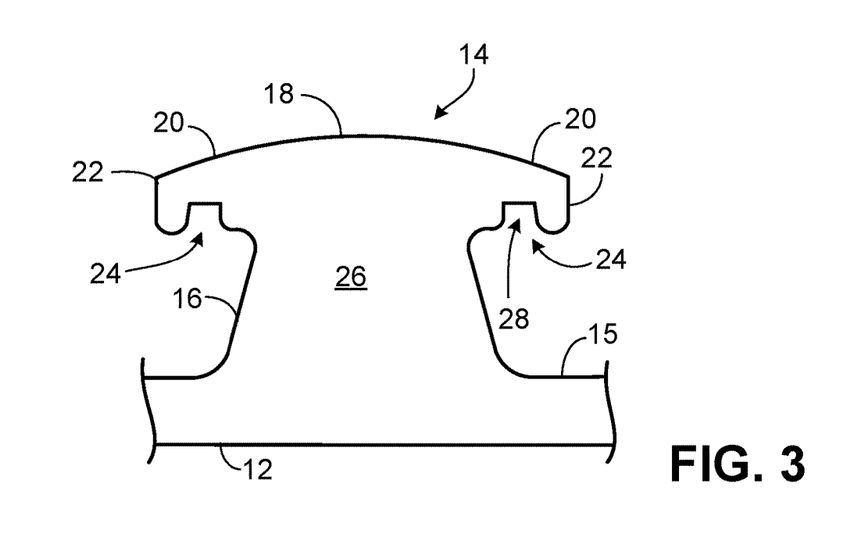
FIG. 3 is a side view of a single fastener element of the fastener product of FIG. 1.

Referring also to FIG. 2, the fastener elements 14 of the adjacent columns overlap each other slightly in the machine direction. Specifically, it is the distal ends of the heads of the fastener elements that overlap, not the stems. Referring also to FIG. 3, each fastener element 14 has a molded stem 16 that rises from the resin sheet 12 to a head 18 disposed at an upper end of the stem and spaced from the resin sheet. The head 18 has two arms 20 that extend in opposite directions to distal ends 22, the arms having respective lower surfaces 24 that overhang the resin sheet. Each fastener element 14 has two opposite and molded side surfaces 26, in this case parallel side surfaces, that form contiguous surfaces of the stem 16 and both arms 20.

The lower surface 24 of each arm 20 defines a recess 28 extending away from the resin sheet 12 and disposed between lower arm surface portions, a shoulder 32 and a tip 30, that face the resin sheet, such that the recess 28 of each arm is spaced from both the stem 16 and the distal end 22 of the arm 20. In this example, each arm 20 features exactly one recess 28 that extends through the thickness of the fastener element from one vertical side surface 26 to the other. The recess 28 of each arm is bounded on one side in the machine direction by shoulder 32 formed by the lower surface of the arm between the recess and the stem. In this example, each recess 28 is defined between generally vertical portions 34 of the lower surface of the arm. Another way to describe the nature of recess 28 is to say that it defined between two downwardly extending head projections 34, both spaced laterally from the stem 16.

Figure 4:
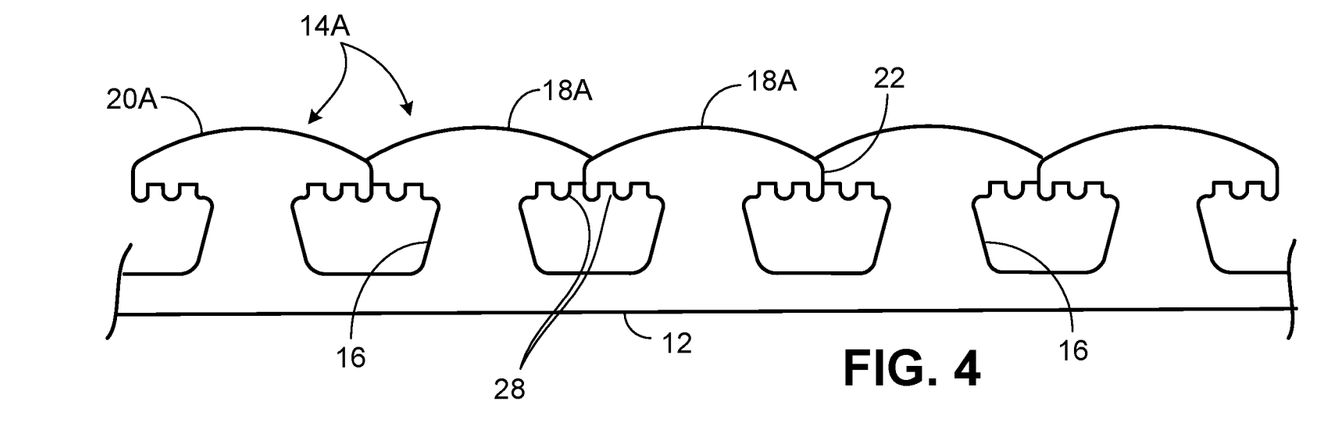
FIG. 4 is a side view of a second embodiment of fastener product.
Figure 5:
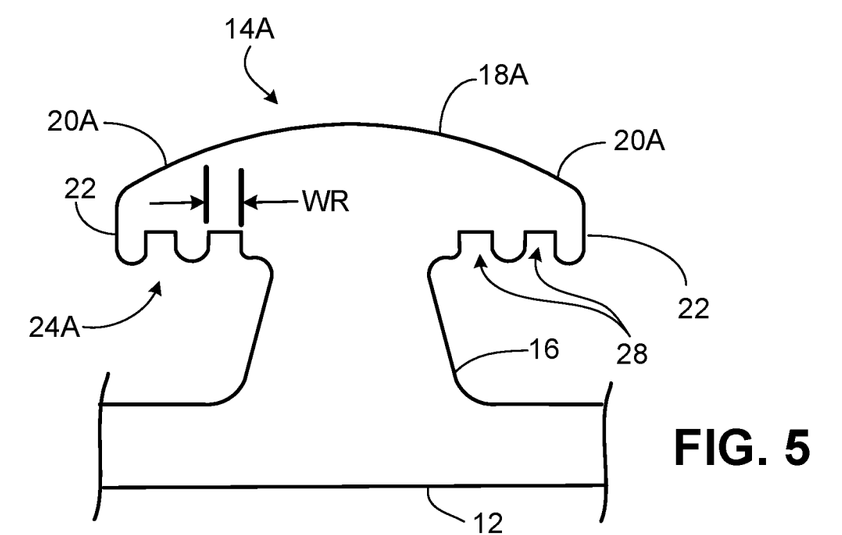
FIG. 5 is a side view of a single fastener element of the fastener product of FIG. 4.

Referring next to FIGS. 4 and 5, in a second embodiment of fastener product 10A, having fastener elements 14A arranged in staggered columns as in the previous example, the fastener elements 14A are very similar in structure to the fastener elements of the previous example. The only difference is that the stem 16 is slightly narrower in the machine direction such that the head 18A overhangs the resin sheet 12 farther in each direction and the lower surfaces 24A of the arms 20A each feature two spaced apart recesses 28 extending away from the resin sheet 12, with each of the recesses 28 spaced from both the stem 16 and the distal end 22 of the arm 20A.

Each of the recesses 28 in the underside surfaces of the heads of the fastener elements in these first two embodiments has a width WR, measured in the lateral machine direction, that is approximately equal to the lateral spacing between the distal end 22 and the nearest recess, and between the two adjacent recesses of the second embodiment, such that, when viewed in the cross-machine direction, each recess forms essentially a square opening across the fastener element, but for the radii of the downward projections. This dimension WR is, in these examples, about 0.0686 mm. As noted, each of the recesses 28 is defined between vertical wall portions of the underside surface of an arm of the head.

Figure 6:
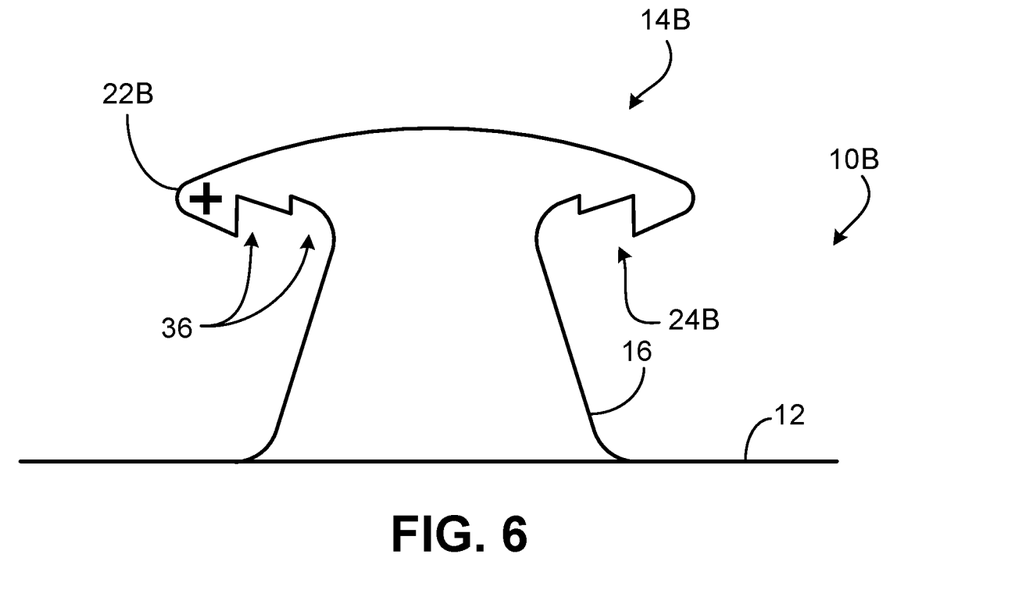
FIG. 6 is a side view of a single fastener element of a third embodiment of fastener product.

Referring next to FIG. 6, in a third embodiment of fastener product 10B, having fastener elements 14B arranged similarly in staggered columns as in the previous examples (only one element being shown for illustration), the fastener elements 14B have lower surfaces 24B that feature a different shape of recess. In this embodiment, the underside surface of each arm defines two recesses 36, including an outer, larger recess closer to the distal end 22B.

Figure 7:
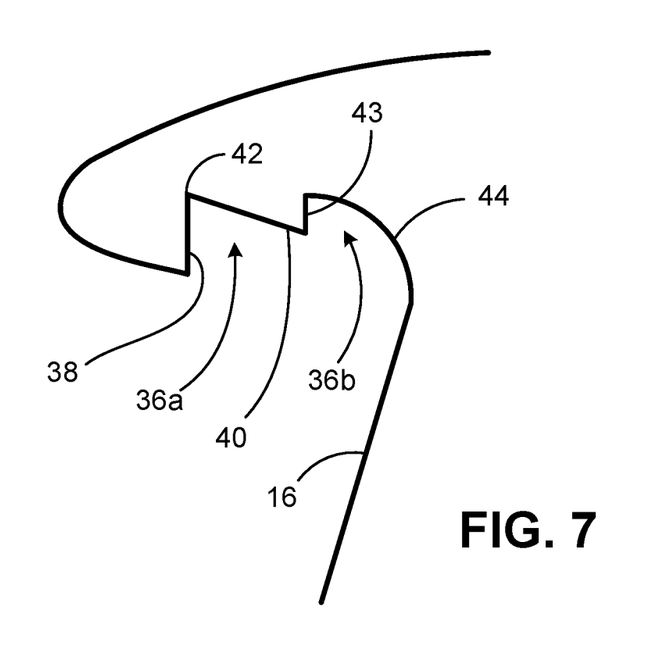
FIG. 7 is an enlarged view of one of a portion of the fastener element of FIG. 6.

Referring also to FIG. 7, the outer recess 36a is defined between a vertical wall segment 38 and an angled wall segment 40, which meet at an apex 42. The smaller, inner recess 36b is defined between a smaller vertical wall segment 43 and an angled surface 44 that blends into the stem 16. Like the recesses described above, recesses 36a and 36b extend through the thickness of the fastener element to both flat faces of the fastener element. Apex 42 of the outer recess 36a defines an acute angle, as does the similar apex of inner recess 36b, into which snagged fibers are directed, with the vertical wall segments helping to retain the snagged fibers against release. Because of the acute apices and the angled surfaces, recesses 36a and 36b have some similarity to recesses between saw teeth. As illustrated, at least recess 36a is spaced from both the tip of the arm and the stem of the fastener element.

All of the surfaces of the fastener elements shown in the above figures are molded surfaces, meaning that they were solidified against a mold surface in the process of formation. In that sense, the profiles of the illustrated fastener elements can also be understood to be the profiles of fixed cavities in which the fastener elements were molded.

Figure 8:
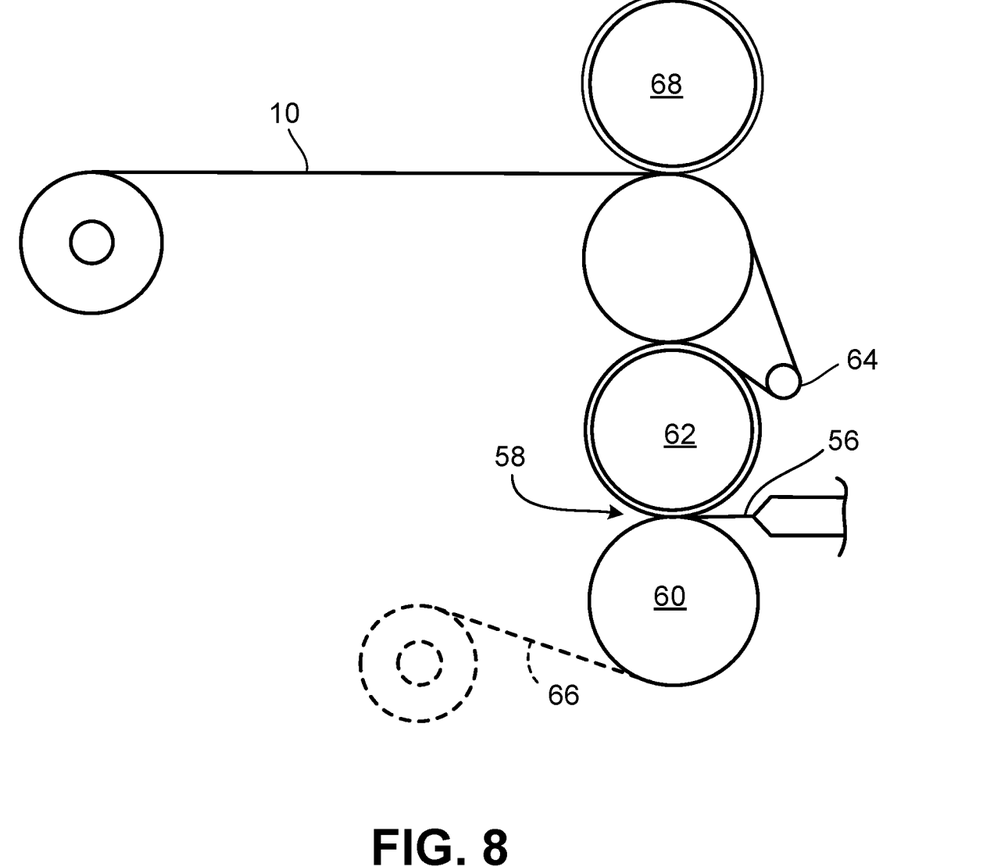
FIG. 8 schematically illustrates a method and apparatus for forming an array of fastener elements with a continuous base sheet.

Referring next to FIG. 8, resin fastener products such as shown in FIG. 1 (with any of the fastener element arrays described above) can be made in a continuous roll-molding process in which molten resin 56 is introduced into a nip 58 between two counter-rotating rolls including a pressure roll 60 and a mold roll 62 that defines cavities in the shape of the above fastener elements. Pressure in nip 58 forces the resin into the cavities, where it solidifies as contiguous resin solidifies on the surface of the roll before being stripped off of the mold roll by being passed around a stripper roll 64 and then spooled for storage. In some cases a preformed web 66 is introduced to the nip with the resin, such that while some of the resin is filling the cavities to form the fastener elements, resin forming the base sheet is laminated directly to the web surface, such as by the resin intermingling with surface features of the web, partially penetrating the web surfaces in the case of a fibrous web. The spooled product in that case comprises the web with the base sheet of resin on one side of the web, and the array of fastener elements extending from the base sheet. The resin can be introduced to the nip in discontinuous volumes to form the base sheet in separate islands or patches or width-wise continuous lanes, each bearing fastener elements. The resin can also be introduced in multiple, spaced apart lanes across the width of the web, to form a fastener product with continuous, longitudinal lanes of fastener elements separated by lanes of exposed web surface.

After molding and being stripped from the cavities, the still warm tape is passed through a further nip and then spooled. In some cases it is passed against a heading roll 68 to knock down any fastener elements that were overly distended during demolding.

Figure 9:
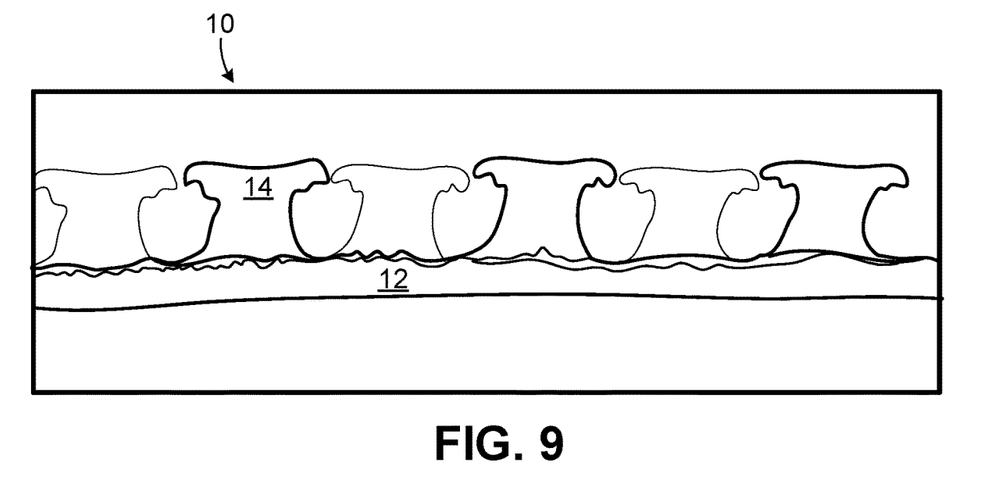
FIG. 9 is a side view of the molded fastener product of FIG. 1.
Figure 10:
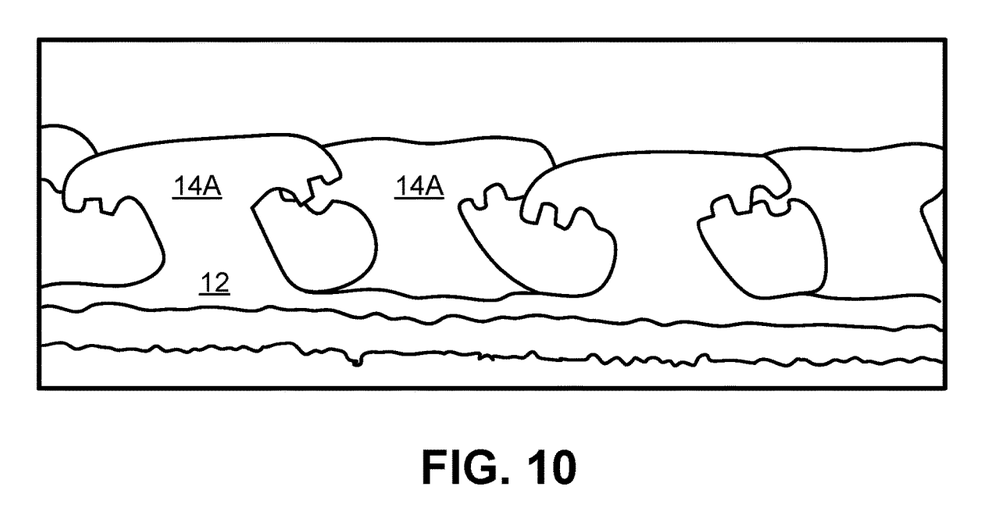
FIG. 10 is a side view of the molded fastener product of FIG. 4.

Referring to FIGS. 9 and 10, the molded product will generally have the shape of the mold cavity, although there may be some plastic distention. The fastener elements may lean slightly in the machine direction, for example, as seen in FIG. 10, which is believed to result from the unequal forces acting on the warm resin during extraction from the cavities. Also, the arms may be slightly distended upward by the extraction forces, as shown in FIG. 9. This can cause the upper surface of the head, which was molded against a mold surface of a fixed radius, to flatten somewhat, as seen by comparing the resulting shapes in FIGS. 9 and 10 with the undistorted shapes (i.e., the shapes of the mold cavities themselves) as seen in FIGS. 2 and 4, respectively. The increasing vertical thickness of the molded resin, moving from tip to stem, resulting primarily from the convex curvature of the head of the fastener element in the mold, enables the extraction of the molded downward projections on either side of each recess, by allowing such molded projections to move upward out of their mold cavity undercuts as the stem is pulled from the cavity, with the arms flexing way from the base to be pulled out through the stem cavity. This can be done under conditions that cause such movement without rupture of the molded resin in the cavity.

Figures 11, 12:
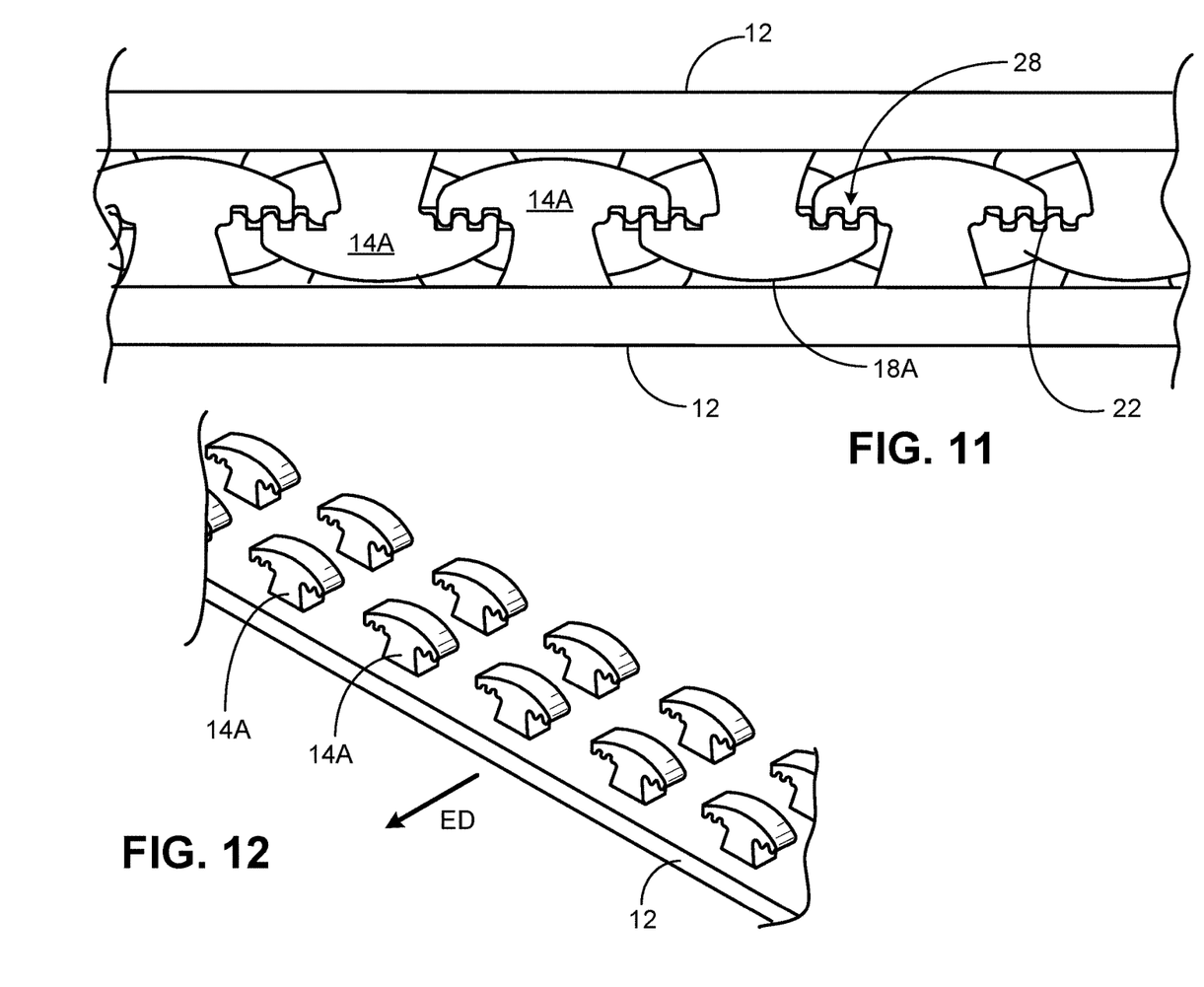
FIG. 11 is a side view of a pair of mated fastener products.
FIG. 12 is a perspective view of a fastener product with fastener element alignment enabling manufacture by an extrusion method.

While the example of FIGS. 4 and 5 will function to releasably engage loops, the fastener element spacing may be set such that it will also function as a self-engaging fastener, in which two such products are pressed together until the undersides of the heads are engaged, resisting separation. FIG. 11 illustrates such a product, in which at least the outer recesses 28 in the underside surface of each head receive the projections at the distal ends 22 of a head of the mating product when engaged. Disengagement requires the head arms to distend sufficiently for the projections to release from the recesses, making a particularly strong fastener that is nevertheless relatively easy to engage.

The male touch fastener products shown in the above figures were molded from Styrene-Ethylene/Butylene-Styrene (SEBS) block co-polymer. The product shown in FIG. 9 was molded from a 60 Shore D resin. The product shown in FIG. 10 was molded from a 90 Shore A (40 Shore D) SEBS. As can be seen in the figure, the fastener elements of the softer resin. Other useful resins include linear Low Density Polyethylene (LLDPE) and polypropylene, such as a polypropylene homopolymer of around 85 Shore D hardness.

As described in U.S. Pat. No. 5,922,222, the contents of which are incorporated herein by reference, the cavities forming each column of fastener elements are defined in the circumferential edge of a mold ring, with several mold rings and alternating solid spacer rings stacked and held under axial load to form an outer surface of mold roll 62 of FIG. 8. The flat side surfaces of the fastener elements are molded against the flat sides of the spacer rings that bound the cavities.

FIG. 12 shows another arrangement of fastener elements, in which the fastener elements 14A of adjacent columns are aligned in rows. This permits the fastener product to be produced by what is known in the art as a cut-and-stretch method, such as taught by Susan Nestegard in U.S. Pat. No. 4,894,060, the contents of which are incorporated herein in their entirety. In such a method, the base and fastener element-shaped rails are extruded through a shaped die in the extrusion direction ED. Following extrusion, the rails are sliced laterally down to the base 12, and then the base is stretched, separating the segments of each rail to create rows of spaced-apart fastener elements. Because the cross-section of each fastener element is constant throughout its width, the product may readily be formed by this alternate method.

While a number of examples have been described for illustration purposes, the foregoing description is not intended to limit the scope of the invention, which is defined by the scope of the appended claims. There are and will be other examples and modifications within the scope of the following claims.

What is claimed is:

1. A touch fastener element, comprising:
a stem rising from a resin sheet; and
a head disposed at an upper end of the stem and spaced from the resin sheet, the head having two arms that extend in opposite directions to distal ends, the arms having respective lower surfaces that overhang the resin sheet;
wherein the fastener element has two opposite side surfaces that form contiguous surfaces of the stem and both arms; and
wherein the lower surface of each arm defines at least one recess extending away from the resin sheet into the arm and disposed between lower arm surface portions that face the resin sheet, such that the recess of each arm is spaced from both the stem and the distal end of the arm.

2. The touch fastener element of claim 1, wherein the recess of each arm is bounded by a shoulder formed by the lower surface of the arm between the recess and the stem.

3. The touch fastener element of claim 1, wherein the recess of each arm is defined between generally vertical portions of the lower surface of the arm.

4. The touch fastener element of claim 1, wherein the recess of each arm is defined between two downwardly extending head projections, both spaced laterally from the stem.

5. The touch fastener element of claim 1, wherein the lower surface of each arm defines multiple spaced apart recesses extending away from the resin sheet, with each of the recesses spaced from both the stem and the distal end of the arm.

6. The touch fastener element of claim 5, wherein each recess is defined by two molded surfaces that meet at an apex of the recess.

7. The touch fastener element of claim 5, wherein all of the multiple recesses defined by the lower surface of each arm are of the same size.

8. The touch fastener element of claim 1, wherein the recesses are defined by molded portions of the lower surfaces of the arms.

9. The touch fastener element of claim 1, wherein each arm features only one recess.

10. The touch fastener element of claim 1, wherein the head has a convex upper surface facing away from the resin sheet and extending to the distal ends of both of the arms.

11. The touch fastener element of claim 1, wherein the fastener element has a cross-section that is constant over a thickness of the fastener element in a direction perpendicular to the opposite directions.

12. The touch fastener element of claim 1, wherein the stem is of resin contiguous with resin of the resin sheet.

13. The touch fastener element of claim 1, wherein the fastener element is bounded by only molded surfaces.

14. The touch fastener element of claim 1, wherein the two opposite surfaces are formed of severed resin.

15. A fastener product, comprising:
a multiplicity of touch fastener elements each comprising:
   a stem rising from a resin sheet; and
   a head disposed at an upper end of the stem and spaced from the resin sheet, the head having two arms that extend in opposite directions to distal ends, the arms having respective lower surfaces that overhang the resin sheet;
wherein each fastener element has two opposite side surfaces that form contiguous surfaces of the stem and arms;
wherein the lower surface of each arm defines at least one recess extending away from the resin sheet into the arm and disposed between lower arm surface portions that face the resin sheet, such that the recess of each arm is spaced from both the stem and the distal end of the arm; and
wherein the touch fastener elements are arranged in an array with the stems of all of the touch fastener elements of the array rising from a common resin sheet.

16. The fastener product of claim 15, wherein the touch fastener element heads are of a lateral width along a column of the array, and wherein the heads of adjacent fastener elements in the column are spaced apart a distance less than the lateral width, and wherein the stems of the adjacent fastener elements are spaced apart a distance greater than the lateral width, such that the fastener product can be engaged with itself to form a releasable fastening.

17. The fastener product of claim 15, wherein the fastener elements are arranged in a checkerboard pattern in the array, with adjacent columns of fastener elements offset from one another.

* * * * *